(12) United States Patent
Tsurutani et al.

(10) Patent No.: US 11,413,985 B2
(45) Date of Patent: Aug. 16, 2022

(54) DIAGNOSIS SYSTEM, DIAGNOSIS METHOD, AND PROGRAM

(71) Applicant: HONDA MOTOR CO., LTD., Tokyo (JP)

(72) Inventors: Taisuke Tsurutani, Wako (JP); Taisuke Kurachi, Wako (JP); Yuuki Ohno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 497 days.

(21) Appl. No.: 16/590,411

(22) Filed: Oct. 2, 2019

(65) Prior Publication Data

US 2020/0114775 A1 Apr. 16, 2020

(30) Foreign Application Priority Data

Oct. 12, 2018 (JP) .............................. JP2018-193451

(51) Int. Cl.
*B60L 58/16* (2019.01)
*B60L 58/15* (2019.01)
*B60L 58/22* (2019.01)

(52) U.S. Cl.
CPC ............... *B60L 58/16* (2019.02); *B60L 58/15* (2019.02); *B60L 58/22* (2019.02)

(58) Field of Classification Search
None
See application file for complete search history.

(56) References Cited

U.S. PATENT DOCUMENTS

| 2013/0249483 | A1* | 9/2013 | Iida | H01M 10/44 320/109 |
| 2014/0191731 | A1* | 7/2014 | Miura | H02J 7/00 320/157 |
| 2018/0037130 | A1* | 2/2018 | Oh | G01R 31/36 |
| 2020/0326382 | A1* | 10/2020 | Matsumura | G01R 31/396 |

FOREIGN PATENT DOCUMENTS

| JP | 2007-178333 | 7/2007 |
| JP | 2013-090359 | 5/2013 |
| JP | 2015-162991 | 9/2015 |
| WO | 2012/157747 | 11/2012 |

OTHER PUBLICATIONS

Japanese Office Action for Japanese Patent Application No. 2018-193451 dated May 26, 2020.

* cited by examiner

*Primary Examiner* — Jared Fureman
*Assistant Examiner* — Joel Barnett
(74) *Attorney, Agent, or Firm* — Amin, Turocy & Watson, LLP

(57) ABSTRACT

A diagnosis system includes: a charging control part that controls, upon connection between a vehicle and a charger provided at an outside of the vehicle, charging from the charger to a secondary battery provided on the vehicle; and a derivation part that derives a degradation degree of the secondary battery based on a change amount of a charging rate of the secondary battery and an integration value of a charging current of the secondary battery, wherein the charging control part determines, based on a remaining time until a next departure time of the vehicle, whether specific charging in which a charging pause period is provided in a middle of a charging time of the secondary battery is performed.

13 Claims, 7 Drawing Sheets

DIAGNOSIS SYSTEM, DIAGNOSIS METHOD, AND PROGRAM

CROSS-REFERENCE TO RELATED APPLICATION

Priority is claimed on Japanese Patent Application No. 2018-193451, filed on Oct. 12, 2018, the contents of which are incorporated herein by reference.

BACKGROUND

Field of the Invention

The present invention relates to a diagnosis system, a diagnosis method, and a program.

Background

Recently, an electric vehicle that uses electricity and a hybrid vehicle that uses electricity and an engine have been developed. A motor provided in such vehicles is driven by electric power being supplied from a secondary battery such as a battery. The vehicle has a function of calculating a full-charge capacity of the secondary battery.

The full-charge capacity of the secondary battery is degraded as charging/discharging is repeated. Therefore, there is a technique in which a degree of degradation of a secondary battery is determined, and the degradation of the secondary battery is prevented (for example, refer to Japanese Unexamined Patent Application, First Publication No. 2015-162991). A degradation degree of a secondary battery is obtained, for example, on the basis of an integration value of a discharging amount, a voltage decrease amount, and the like of the secondary battery calculated by a current value, a voltage value, a temperature, and the like of the secondary battery.

SUMMARY

When preventing the degradation of the secondary battery, it is desirable that the degradation degree of the secondary battery can be derived with good accuracy. However, according to the method of the related art, there is a case in which it is difficult to derive the degradation degree of the secondary battery with good accuracy.

An object of an aspect of the present invention is to provide a diagnosis system, a diagnosis method, and a program capable of improving a derivation accuracy of a degradation degree of a secondary battery.

A diagnosis system, a diagnosis method, and a program according to aspects of the present invention employ the following configurations.

(1): An aspect of the present invention is a diagnosis system, including: a charging control part that controls, upon connection between a vehicle and a charger provided at an outside of the vehicle, charging from the charger to a secondary battery provided on the vehicle; and a derivation part that derives a degradation degree of the secondary battery based on a change amount of a charging rate of the secondary battery and an integration value of a charging current of the secondary battery, wherein the charging control part determines, based on a remaining time until a next departure time of the vehicle, whether specific charging in which a charging pause period is provided in a middle of a charging time of the secondary battery is performed.

(2): In the diagnosis system according to the aspect (1) described above, the derivation part may derive the degradation degree of the secondary battery based on a charging rate of the secondary battery at a first time point included in the charging pause period, a charging rate of the secondary battery at a second time point which is before a start of a first charging period set before the charging pause period or after an end of a second charging period set after the charging pause period, and an integration value of a charging current of the second battery between the first time point and the second time point.

(3): In the diagnosis system according to the aspect (1) or (2) described above, the charging control part may determine that the specific charging is performed in a case where there is a margin of a predetermined time or more if the secondary battery is charged to a target charging rate with respect to the remaining time until the next departure time of the vehicle.

(4): In the diagnosis system according to any one of the aspects (1) to (3) described above, the charging pause period may be a time sufficient for stabilization of a state of the secondary battery.

(5): In the diagnosis system according to any one of the aspects (1) to (4) described above, in a case where there is a specific region in which a relationship between a voltage and the charging rate of the secondary battery is changed by more than a predetermined value between before degradation and after degradation of the secondary battery in a transition range of the charging rate of the secondary battery, the charging control part may provide the charging pause period before the charging rate of the secondary battery arrives at the specific region or after the charging rate of the secondary battery is beyond the specific region.

(6): The diagnosis system according to any one of the aspects (1) to (5) described above may further include: a learning part that learns the degradation degree of the secondary battery based on history information indicating a degradation degree of the secondary battery derived by the derivation part at a plurality of time points.

(7): The diagnosis system according to any one of the aspects (1) to (6) described above may further include: an information acquisition part that acquires information indicating the next departure time of the vehicle based on a user's input relating to the next departure time of the vehicle, wherein the charging control part may determine whether the specific charging is performed based on the information indicating the next departure time of the vehicle acquired by the information acquisition part.

(8): The diagnosis system according to any one of the aspects (1) to (7) described above may further include: an estimation part that estimates the next departure time of the vehicle based on a past action history of the vehicle, wherein the charging control part may determine whether the specific charging is performed based on the next departure time of the vehicle estimated by the estimation part.

(9): In the diagnosis system according to any one of the aspects (1) to (8) described above, the charging control part may determine whether the specific charging is performed based on the remaining time until the next departure time of the vehicle and a temperature of the secondary battery at a time of a start of charging.

(10): In the diagnosis system according to any one of the aspects (1) to (9) described above, upon determination that the specific charging is performed, the charging control part may start a charging of the secondary battery and determine whether the specific charging is continued based on a temperature of the secondary battery in a charging time of the secondary battery before the charging pause period.

(11): In the diagnosis system according to any one of the aspects (1) to (10) described above, the charging control part may determine whether the specific charging is performed based on the remaining time until the next departure time of the vehicle and an amplitude of charging electric power that can be output by the charger.

(12): Another aspect of the present invention is a diagnosis method performed by one or more computers, the diagnosis method including: controlling, upon connection between a vehicle and a charger provided at an outside of the vehicle, charging from the charger to a secondary battery provided on the vehicle; deriving a degradation degree of the secondary battery based on a change amount of a charging rate of the secondary battery and an integration value of a charging current of the secondary battery; and determining, based on a remaining time until a next departure time of the vehicle, whether specific charging in which a charging pause period is provided in a middle of a charging time of the secondary battery is performed.

(13): Still another aspect of the present invention is a computer-readable non-transitory recording medium including a program causing one or more computers to execute: controlling, upon connection between a vehicle and a charger provided at an outside of the vehicle, charging from the charger to a secondary battery provided on the vehicle; deriving a degradation degree of the secondary battery based on a change amount of a charging rate of the secondary battery and an integration value of a charging current of the secondary battery; and determining, based on a remaining time until a next departure time of the vehicle, whether specific charging in which a charging pause period is provided in a middle of a charging time of the secondary battery is performed.

According to the aspects (1) to (13), it is possible to improve the derivation accuracy of the degradation degree of the secondary battery.

DESCRIPTION OF EMBODIMENTS

Hereinafter, a diagnosis system, a diagnosis method, and a program according to an embodiment of the present invention will be described with reference to the drawings.

[Vehicle 10]

Figure 1:
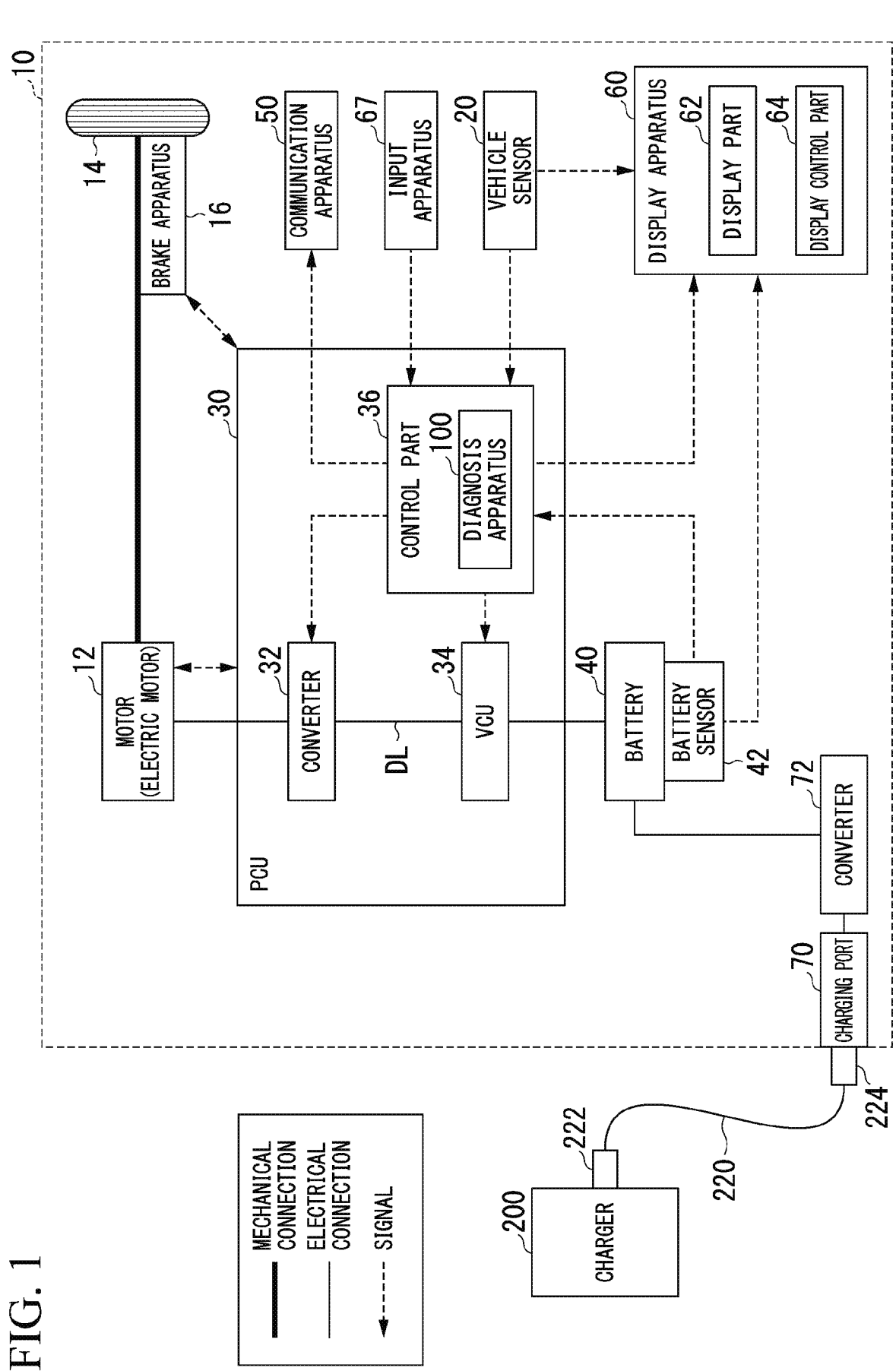
FIG. 1 is a view showing an example of a configuration of a vehicle according to an embodiment.

FIG. 1 is a view showing an example of a configuration of a vehicle 10 according to an embodiment. As shown in FIG. 1, the vehicle 10 includes, for example, a motor 12, a driving wheel 14, a brake apparatus 16, a vehicle sensor 20, a PCU (Power Control Unit) 30, a battery (secondary battery) 40, a battery sensor 42 such as a voltage sensor, a current sensor, and a temperature sensor, a communication apparatus 50, a display apparatus 60, an input apparatus 67, a charging port 70, and a converter 72.

The motor 12 is, for example, a three-phase AC electric motor. A rotor of the motor 12 is connected to the driving wheel 14. The motor 12 outputs power to the driving wheel 14 using a supplied electric power. The motor 12 generates electric power using kinetic energy of the vehicle 10 at the time of decelerating the vehicle.

The brake apparatus 16 includes, for example, a brake caliper, a cylinder that transmits a hydraulic pressure to the brake caliper, and an electric motor that generates the hydraulic pressure in the cylinder. The brake apparatus 16 may include a mechanism that transmits the hydraulic pressure generated by an operation on a brake pedal to the cylinder via a master cylinder as a backup. The brake apparatus 16 is not limited to the configuration described above and may be an electronic control-type hydraulic brake apparatus that transmits a hydraulic pressure of the master cylinder to the cylinder.

The vehicle sensor 20 includes an acceleration opening degree sensor, a vehicle speed sensor, and a brake depression amount sensor. The acceleration opening degree sensor is attached to an acceleration pedal as an example of an operator accepting an acceleration command by a driver, detects the amount of operation of the acceleration pedal, and outputs the detected amount of operation to the control part 36 of the PCU 30 as an acceleration opening degree. The vehicle speed sensor includes, for example, vehicle wheel speed sensors attached to vehicle wheels and a speed calculator, derives a speed of the vehicle 10 (vehicle speed) by combining vehicle wheel speeds detected by the vehicle wheel speed sensors, and outputs the derived speed to the control part 36 and the display apparatus 60. The brake depression amount sensor is attached to the brake pedal. The brake depression amount sensor detects the amount of operation of the brake pedal and outputs the detected amount of operation of the brake pedal to the control part 36 as a brake depression amount.

The PCU 30 includes, for example, a converter 32, a VCU (Voltage Control Unit) 34, and a control part 36. An integrated configuration of such constituent elements as the PCU 30 is merely an example, and such constituent elements may be arranged in a distributed manner.

The converter 32 is, for example, an AC-DC converter. A DC-side terminal of the converter 32 is connected to a DC link DL. The battery 40 is connected via the VCU 34 to the DC link DL. The converter 32 converts an AC generated by the motor 12 into a DC and outputs the DC to the DC link DL.

The VCU 34 is, for example, a DC-DC converter. The VCU 34 increases a voltage of the electric power supplied from the battery 40 and outputs the electric power to the DC link DL.

The control part 36 includes, for example, a motor control part, a brake control part, a battery VCU control part, and a diagnosis apparatus 100. The motor control part, the brake control part, and the battery VCU control part may be replaced by separate control apparatuses which are, for example, a control apparatus such as a motor ECU, a control apparatus such as a brake ECU, and a control apparatus such as a battery ECU. Part of the functions of the diagnosis apparatus 100 may be provided, for example, on the charger 200 or a center server that is communicable to the vehicle 10 via a network. Such an example will be described later.

The motor control part controls the motor 12 on the basis of an output of the vehicle sensor 20. The brake control part controls the brake apparatus 16 on the basis of an output of the vehicle sensor 20. The battery VCU control part calculates a charging rate (SOC: State Of Charge) of the battery 40 on the basis of an output of the battery sensor 42 attached to the battery 40 and outputs the calculated charging rate to the VCU 34 and the display apparatus 60. The charging rate is information indicating a point between a full discharge (0%) and a full charge (100%) at which the charge state of the secondary battery at a certain time point is. The VCU 34 increases a voltage of the DC link DL in response to a command from the battery VCU control part.

The battery 40 is, for example, a secondary battery such as a lithium ion battery. The battery 40 accumulates electric power introduced from the charger 200 provided outside the vehicle 10 and discharges for traveling of the vehicle 10. The battery sensor 42 includes, for example, a current sensor, a voltage sensor, and a temperature sensor. The battery sensor 42 detects, for example, a current value, a voltage value, and a temperature of the battery 40. The battery sensor 42 outputs the detected current value, the detected voltage value, the detected temperature, and the like to the control part 36 and the display apparatus 60.

The communication apparatus 50 includes a radio module used for connecting to a cellular network or a Wi-Fi network.

The communication apparatus 50 transmits, for example, information acquired by the diagnosis apparatus 100 to a server such as a center server through a network. The communication apparatus 50 receives information transmitted from the server through the network. The communication apparatus 50 outputs the received information to the display apparatus 60.

The display apparatus 60 includes, for example, a display part 62 and a display control part 64. The display part 62 displays information in accordance with a control by the display control part 64. The display control part 64 allows the display part 62 to display, for example, information indicating a degradation degree of the battery 40 in accordance with information output from the control part 36 and the communication apparatus 50. The display control part 64 allows the display part 62 to display a vehicle speed and the like output from the vehicle sensor 20.

The display apparatus 60 may allow the display part 62 to display information for having a user select whether a "SOH calculation charging" described later may be performed on the basis of a control of the diagnosis apparatus 100. For example, the display apparatus 60 may allow the display part 62 to display the information for having a user select whether the "SOH calculation charging" may be performed in a case where there is no user's input relating to a next departure time of the vehicle 10. Such information may be displayed on a second display apparatus 95 described later.

The input apparatus 67 is, for example, a touch panel-type input apparatus provided to be overlapped with the display part 62 of the display apparatus 60 or the second display apparatus 95 described later. The input apparatus 67 accepts a user's input to the vehicle 10. For example, the input apparatus 67 accepts a user's input relating to a next departure time of the vehicle 10. The "input relating to the next departure time" is not limited to a user's input that directly assigns the next departure time and may be an input that indirectly indicates the next departure time such as an input that assigns (reserves) an operation start time of an air conditioner provided on the vehicle 10. The input apparatus 67 outputs information indicating the accepted user's input to the control part 36.

In a case where the information for having a user select whether the "SOH calculation charging" may be performed is displayed on the display part 62, the input apparatus 67 may accept a user's input that selects whether the "SOH calculation charging" may be performed. The input apparatus 67 is not limited to the touch panel-type input apparatus and may be a voice-type input apparatus or another input apparatus.

The charging port 70 is provided to face the outside of a vehicle body of the vehicle 10. The charging port 70 is connected to the charger 200 via a charging cable 220. The charging cable 220 includes a first plug 222 and a second plug 224. The first plug 222 is connected to the charger 200, and the second plug 224 is connected to the charging port 70. Electricity supplied from the charger 200 is supplied to the charging port 70 via the charging cable 220.

The charging cable 220 includes a signal cable provided on an electric power cable. The signal cable relays a communication between the vehicle 10 and the charger 200. Accordingly, an electric power connector and a signal connector are provided on each of the first plug 222 and the second plug 224.

The converter 72 is provided between the battery 40 and the charging port 70. The converter 72 converts a current introduced from the charger 200 via the charging port 70 such as an AC current into a DC current. The converter 72 outputs the converted DC current to the battery 40.

Figure 2:
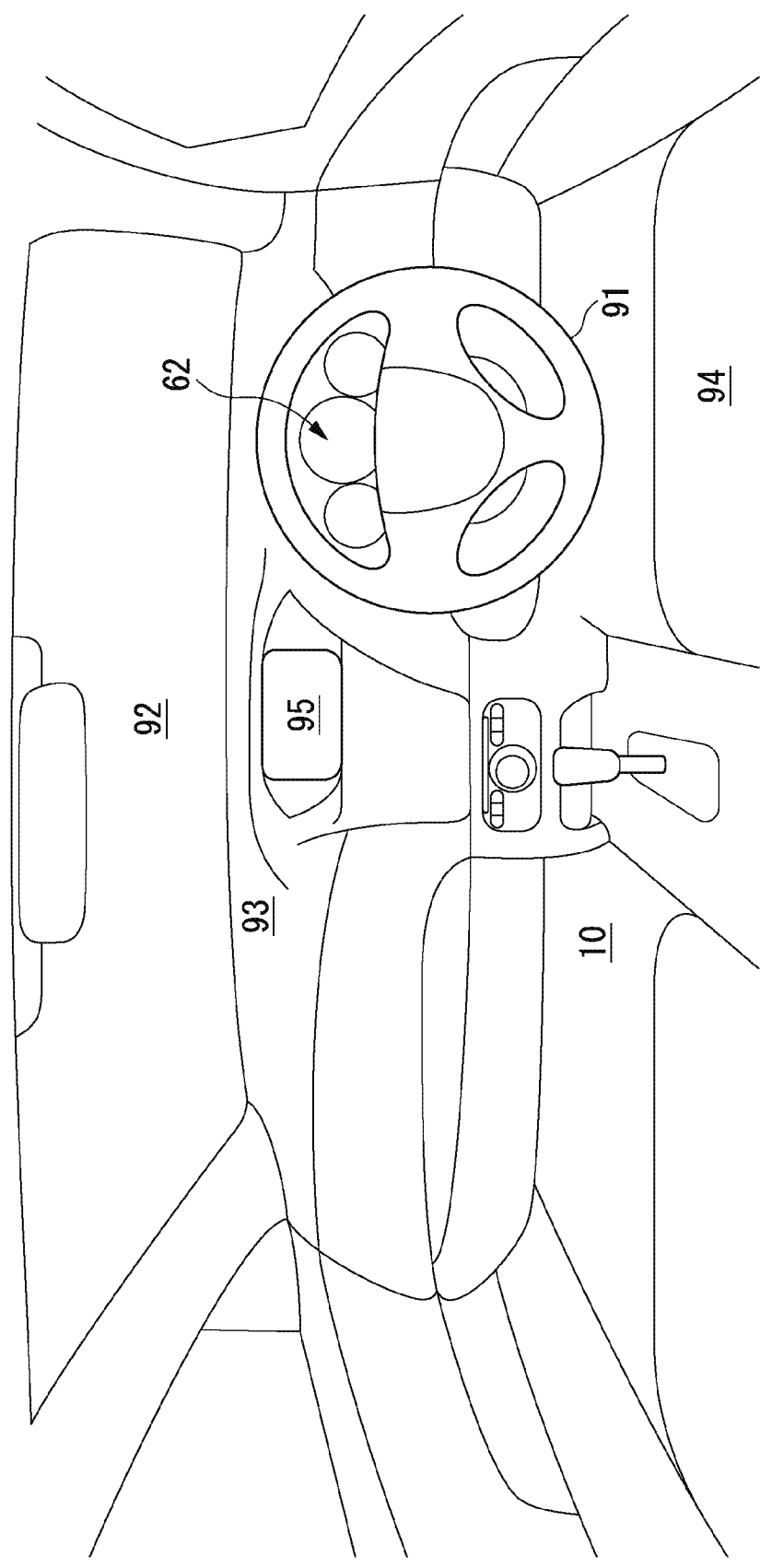
FIG. 2 is a view showing an example of a configuration inside a vehicle room of a vehicle.

FIG. 2 is a view showing an example of a configuration inside a vehicle room of the vehicle 10. As shown in FIG. 2, for example, a steering wheel 91 that controls steering of the vehicle 10, a front windshield 92 that sections the outside of the vehicle and the inside of the vehicle room, and an instrument panel 93 are provided on the vehicle 10. The front windshield 92 is a member having a light transmission property.

The display part 62 of the display apparatus 60 is provided in the vicinity of the front of a driver's seat 94 on the instrument panel 93 inside the vehicle room. The display part 62 is visually recognizable by a driver through a gap in the steering wheel 91 or over the steering wheel 91. The second display apparatus 95 is provided on the middle of the instrument panel 93. The second display apparatus 95, for example, displays an image corresponding to a navigation process performed by a navigation apparatus (not shown) provided on the vehicle 10 or displays a video or the like of a partner in a video telephone call. The second display apparatus 95 may display a television program, play back a DVD, or display content such as a downloaded movie.

Figure 3:
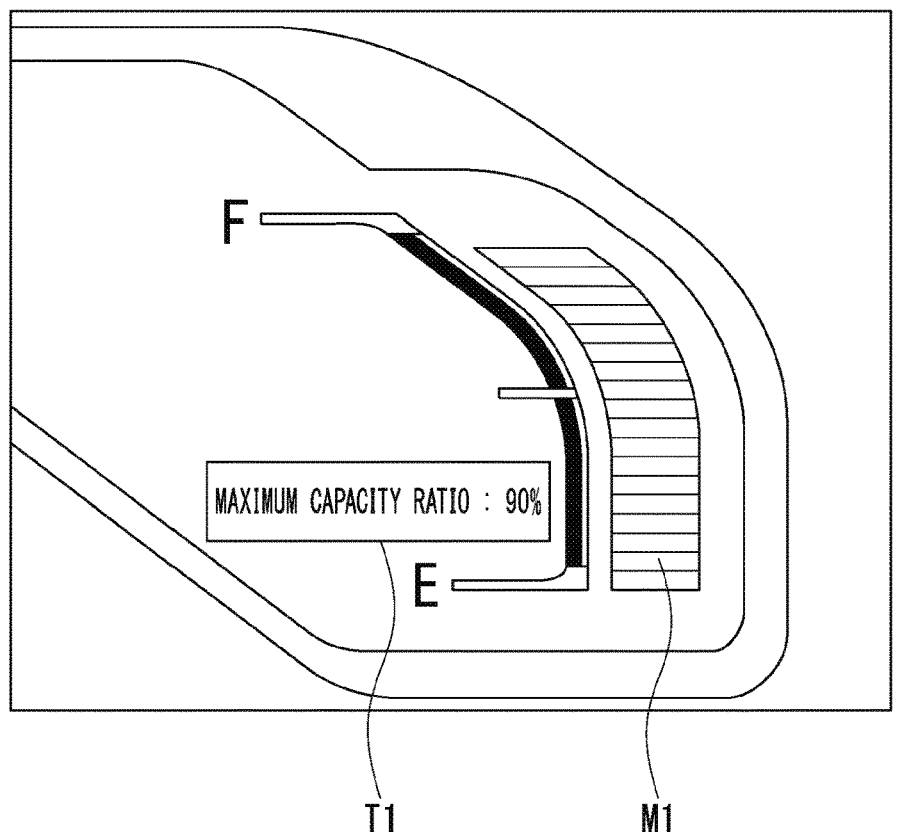
FIG. 3 is an example showing an example of a screen displayed on a display part.

FIG. 3 is a view showing an example of a screen displayed on the display part 62. As shown in FIG. 3, for example, a degradation degree (degradation state) T1 of the battery 40 and a battery charging rate meter M1 are displayed on the display part 62. The degradation degree is, for example, a ratio of a current full charge capacity to an initial full charge capacity (hereinafter, referred to as a "maximum capacity ratio"). That is, the degradation degree represents a ratio of degradation of the current full charge capacity relative to the initial full charge capacity. The degradation degree T1 is displayed using a numeral, and the battery charging rate meter M1 is displayed using a meter. For example, in FIG. 3, the degradation degree T1 represents a state in which the current full charge capacity is degraded by 10% relative to the initial full charge capacity (the maximum capacity ratio is 90%). For example, the battery charging rate meter M1 indicates a value of "F" of the meter in a case where the battery 40 is fully charged (in a case where the charging rate is 100%). For example, the battery charging rate meter M1 indicates a value of "E" of the meter in a case where the battery 40 is fully discharged (in a case where the charging rate is 0%).

Figure 4:
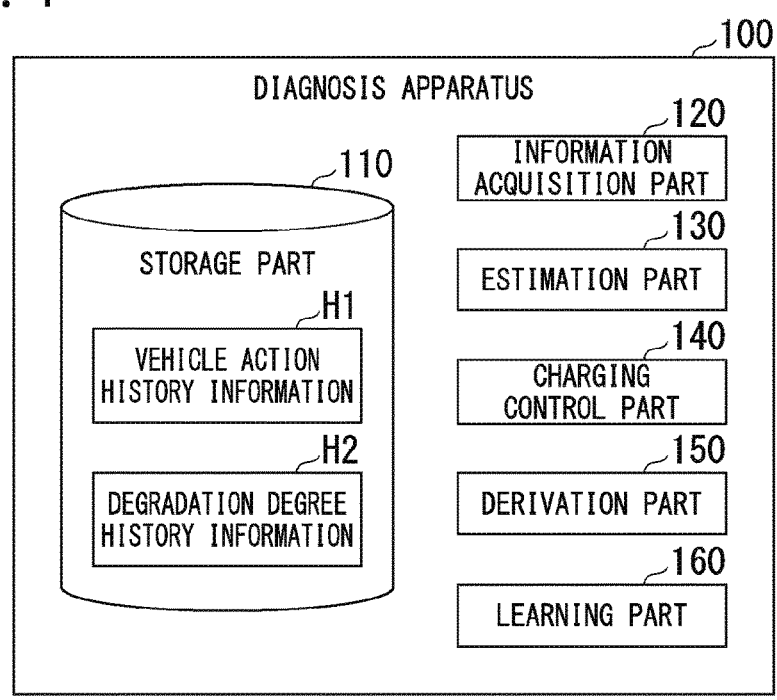
FIG. 4 is a block diagram showing a specific example of a function of a diagnosis apparatus.

FIG. 4 is a view showing an example of a function configuration of the diagnosis apparatus 100. The diagnosis apparatus 100 includes, for example, a storage part 110, an information acquisition part 120, an estimation part 130, a charging control part 140, a derivation part 150, and a learning part 160. The diagnosis apparatus 100 is an example of a "diagnosis system". The diagnosis apparatus 100 may be referred to as a "learning apparatus" or a "learning system".

The storage part 110 is configured using a storage apparatus such as a magnetic hard disk apparatus or a semiconductor storage apparatus. The storage part 110 stores vehicle action history information H1 and battery degradation degree history information H2 (hereinafter, referred to as "degradation degree history information H2"). The vehicle action history information H1 is history information indicating a past action history of the vehicle 10. For example, the vehicle action history information H1 is information corresponding to a usage history of the vehicle 10 by a user and is information in which traveling, stopping (including parking), and the like of the vehicle 10 are stored in a time series. The degradation degree history information H2 is history information indicating a degradation degree of the battery 40 derived by the derivation part 150 at a plurality of past time points.

Figure 8:
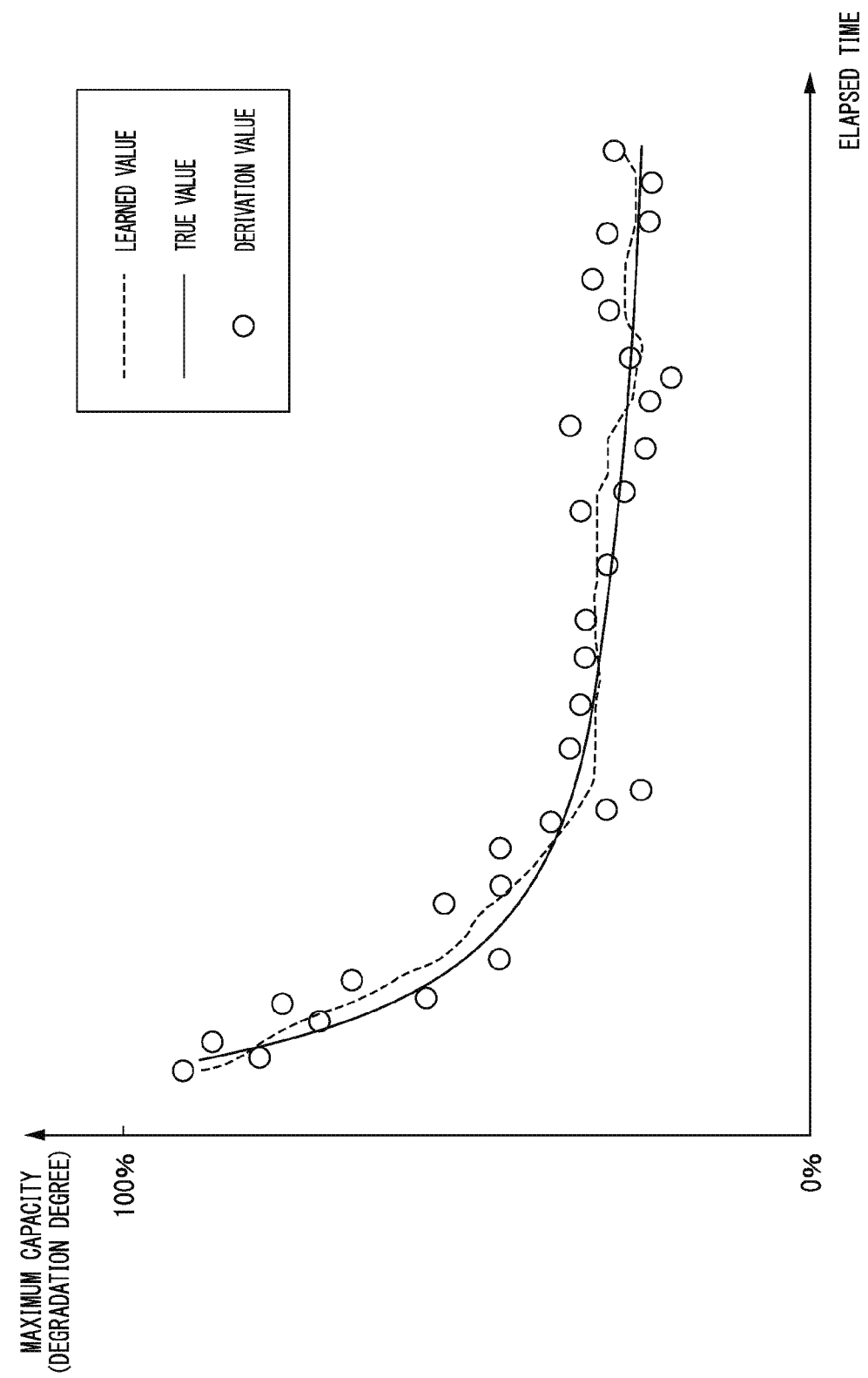
FIG. 8 is a view showing a specific example of a degradation degree of a battery.

For example, the degradation degree history information H2 is information in which an elapsed time from a new state of the battery 40 and a degradation degree of the battery 40 are associated with each other at each of past time points (information corresponding to a white circle mark shown in FIG. 8).

Configuration elements other than the storage part 110 of the diagnosis apparatus 100 are realized, for example, by a hardware processor such as a CPU (Central Processing Unit) executing a program (software). Some or all of such constituent elements may be realized by hardware (a circuit part; including circuitry) such as a LSI (Large-Scale Integration), an ASIC (Application-Specific Integrated Circuit), a FPGA (Field-Programmable Gate Array), or a GPU (Graphics-Processing Unit), or may be realized by software and hardware in cooperation. The program may be stored in advance in a storage apparatus (storage apparatus that includes a non-transitory storage medium) such as a HDD (Hard Disk Drive) or a flash memory, or may be stored in a removable storage medium (non-transitory storage medium) such as a DVD or a CD-ROM and installed by the storage medium being attached to a drive apparatus. The diagnosis apparatus 100 itself may be a software function of the control part 36.

The information acquisition part 120 receives information indicating a user's input performed to the input apparatus 67 from the input apparatus 67 and thereby acquires the information. For example, the information acquisition part 120 acquires information indicating the next departure time of the vehicle 10 on the basis of a user's input relating to the next departure time of the vehicle 10 performed to the input apparatus 67. The information acquisition part 120 outputs the acquired information indicating the next departure time of the vehicle 10 to the charging control part 140. The information acquisition part 120 is not an indispensable configuration element and may be omitted.

For example, in a case where the information indicating the next departure time of the vehicle 10 is not acquired by the information acquisition part 120, the estimation part 130 estimates the next departure time of the vehicle 10 on the basis of the vehicle action history information H1 stored in the storage part 110 and a situation (a season, a day of the week, a time slot, a position of the vehicle 10, and the like) at that time point. For example, the estimation part 130 estimates the next departure time of the vehicle 10 on the basis of a situation indicating the current season, the current day of the week, the current time slot, and the current position of the vehicle 10 and an action pattern of the vehicle 10 in a past situation that is similar to the current situation. The estimation part 130 may be realized by a predetermined algorithm or may be realized by a learning-completed model constituted of a neural network that has performed machine learning using the vehicle action history information H1 as teacher data. In this case, the learning-completed model is a model that outputs an estimation value of the next departure time of the vehicle 10 as output data when the season, the day of the week, the time slot, the position of the vehicle 10, and the like are input as input data. The estimation part 130 outputs the estimated next departure time of the vehicle 10 to the charging control part 140.

The charging control part 140 controls charging from the charger 200 to the battery 40 in a case where the vehicle 10 and the charger 200 are connected together.

In the present embodiment, the charging control part 140 determines whether the SOH calculation charging described later is performed on the basis of the remaining time until the next departure time of the vehicle 10. That is, the charging control part 140 selects whether to perform ordinary charging (normal charging) or perform the SOH calculation charging on the basis of the remaining time until the next departure time of the vehicle 10.

Figure 5:
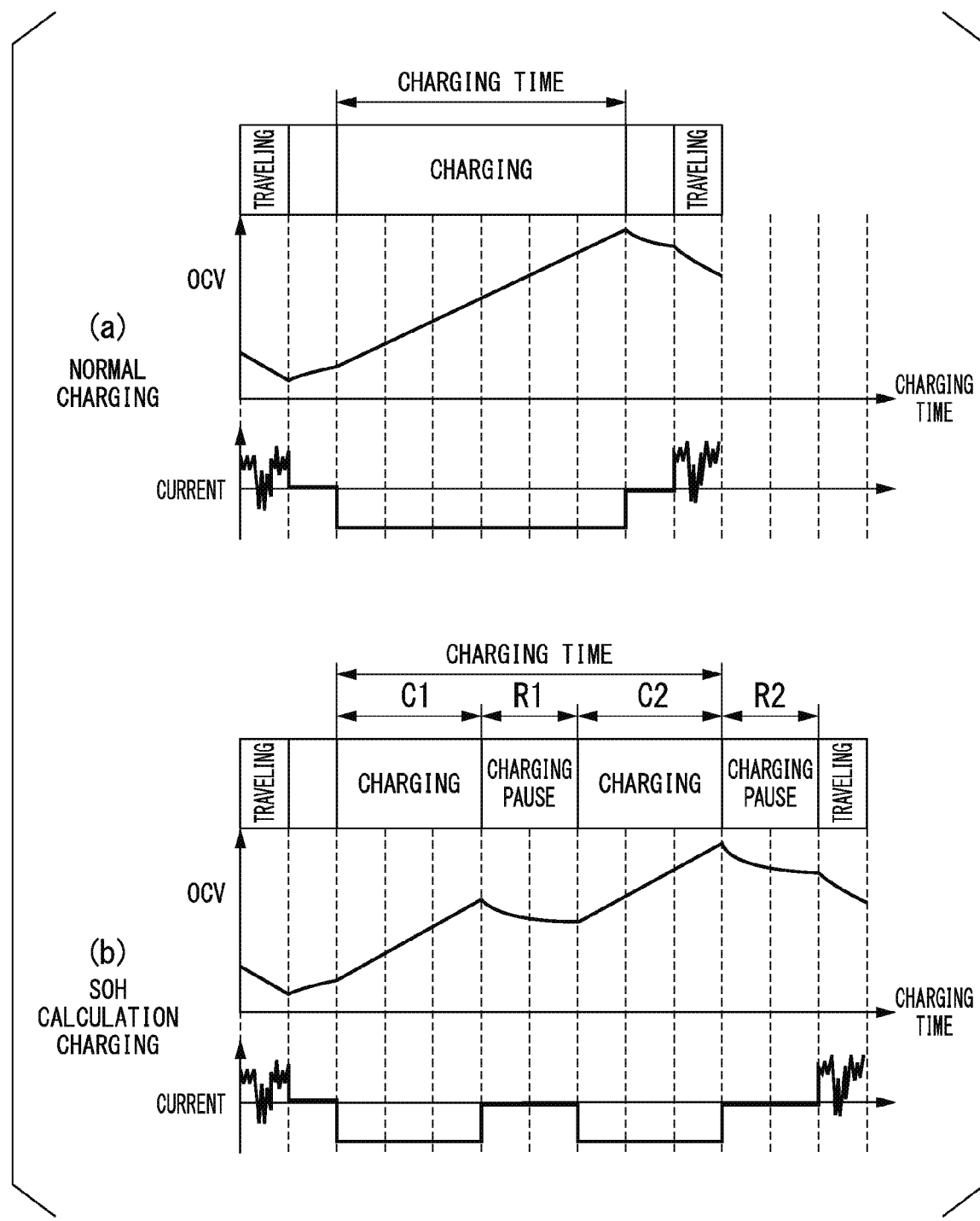
FIG. 5 is a view showing two charging methods selected by a charging control part.

FIG. 5 is a view showing two charging methods selected by the charging control part 140. Part (a) of FIG. 5 is a view showing the ordinary charging. Part (b) of FIG. 5 is a view showing the SOH calculation charging. An OCV (Open Circuit Voltage) of a vertical axis of FIG. 5 means a voltage of the battery 40 in a state where a voltage and a current are not applied to the battery 40.

The term "ordinary charging" means a charging in which a charging pause period in which the charging of the battery 40 is paused is not present in the middle of a charging time of the battery 40 (that is, between a start of charging of the battery 40 and an end of charging of the battery 40 that amounts to a target charging rate). That is, in the ordinary charging, charging electric power is continuously supplied from the charger 200 to the battery 40 from the start of charging of the battery 40 to the end of charging of the battery 40 that amounts to the target charging rate. The "target charging rate" is a target value of a charging rate of the battery 40, is not limited to a fixed value, and may be a variable value set in accordance with a state of the battery 40, a surrounding environment, and the like. The target charging rate is not limited to 100% and may be a value other than 100% such as 80% or 90%. Such definitions of the target charging rate are similar for the SOH calculation charging.

The "SOH calculation charging" is a charging method suitable for calculating a degradation degree (SOH: State Of Health) of the battery 40. The SOH calculation charging is a charging in which one or more charging pause periods (first charging pause period) R1 in which the charging of the battery 40 is paused is provided in the middle of a charging time of the battery 40 (that is, between a start of charging of the battery 40 and an end of charging of the battery 40 that amounts to a target charging rate). That is, the charging pause period R1 is set between a first charging period C1 and a second charging period C2 that are included in the charging time. Each of the first charging period C1 and the second charging period C2 is a period in which the charging electric power is supplied from the charger 200 to the battery 40. On the other hand, the charging pause period R1 is a period in which the supply of the charging electric power from the charger 200 to the battery 40 is stopped. The charging pause period R1 is a time (for example, an hour) sufficient for stabilization of the state of the battery 40. The "SOH calculation charging" is an example of a "specific charging".

In the SOH calculation charging of the present embodiment, a charging pause period (second charging pause period) R2 is also provided before the start of charging of the battery 40 (that is, before the first charging period C1) and/or after the end of charging of the battery 40 (that is, after the second charging period C2, in other words, after the battery 40 is charged to the target charging rate). The charging pause period R2 is a period in which the supply of the charging electric power from the charger 200 to the battery 40 is stopped similarly to the charging pause period R1 described above. The charging pause period R2 is a time (for example, an hour) sufficient for stabilization of the state of the battery 40.

The example in FIG. 5 shows a case in which the charging pause period R2 is provided after the end of charging of the battery 40. That is, the charging pause period R2 is set after the end of charging of the battery 40 and before the next departure time of the vehicle 10. The following embodiment is described using an example of the case in which the charging pause period R2 is provided after the end of charging of the battery 40 as shown in FIG. 5. In the following description, the "charging pause period R1" is referred to as a "first charging pause period R1", and the "charging pause period R2" is referred to as a "second charging pause period R2".

The charging control part 140 determines whether the SOH calculation charging is performed on the basis of the information indicating the next departure time of the vehicle 10 acquired by the information acquisition part 120 (the next departure time directly assigned by the user, the operation start time of the air conditioner, or the like) in a case where there is a user's input relating to the next departure time of the vehicle 10. The charging control part 140 determines whether the SOH calculation charging is performed on the basis of the next departure time of the vehicle 10 estimated by the estimation part 130, for example, in a case where there is no user's input relating to the next departure time of the vehicle 10.

In the present embodiment, the charging control part 140 determines that the SOH calculation charging is performed in a case where there is a margin of a predetermined time or more if the battery 40 is charged to the target charging rate with respect to the remaining time until the next departure time of the vehicle 10. The "predetermined time" is, for example, a total time of the first charging pause period R1 and the second charging pause period R2. That is, the "case where there is a margin of a predetermined time or more" is a case where the remaining time until the next departure time of the vehicle 10 is longer than a total value of the charging pause periods R1, R2 and a required time (charging time) for charging the battery 40 to the target charging rate.

On the other hand, the charging control part 140 determines that the ordinary charging is performed in a case where there is no margin of the predetermined time or more if the battery 40 is charged to the target charging rate with respect to the remaining time until the next departure time of the vehicle 10. The "case where there is no margin of the predetermined time or more" is a case where the remaining time until the next departure time of the vehicle 10 is shorter than the total value of the charging pause periods R1, R2 and the required time (charging time) for charging the battery 40 to the target charging rate.

Alternatively, the charging control part 140 may determine whether the SOH calculation charging is performed on the basis of the remaining time until the next departure time of the vehicle 10 and a temperature of the battery 40 at the time of the start of charging. That is, the charging control part 140 may determine that the ordinary charging is performed in a case where the temperature of the battery 40 at the time of the start of charging is less than a threshold value even in a case where there is a margin of the predetermined time or more if the battery 40 is charged to the target charging rate with respect to the remaining time until the next departure time of the vehicle 10.

Further, upon determination that the SOH calculation charging is performed, the charging control part 140 may start a charging of the battery 40 and determine whether the SOH calculation charging is continued on the basis of the temperature of the battery 40 in a charging time of the battery 40 before the first charging pause period R1. That is, in a case where the temperature of the battery 40 in the charging time of the battery 40 before the first charging pause period R1 is less than a threshold value (for example, in a case where the temperature of the battery 40 does not become equal to or more than the threshold value immediately before the first charging pause period R1), the charging control part 140 may determine that the SOH calculation charging is canceled and is switched to the ordinary charging.

Further, the charging control part 140 may determine whether the specific charging is performed on the basis of the remaining time until the next departure time of the vehicle 10 and an amplitude of the charging electric power that can be output by the charger 200. That is, the charging control part 140 may determine that the ordinary charging is performed in a case where the amplitude of the charging electric power that can be output by the charger 200 is less than a threshold value even in a case where there is a margin of the predetermined time or more if the battery 40 is charged to the target charging rate with respect to the remaining time until the next departure time of the vehicle 10.

Next, the first charging pause period R1 set by the charging control part 140 will be described in detail. In a case where there is a specific region in which a relationship between a voltage and the charging rate of the battery 40 is changed by more than a predetermined value between before degradation and after degradation of the battery 40 in a transition range (a range of 0% to 100% of the charging rate) of the charging rate of the battery 40, the charging control part 140 provides the first charging pause period R1 before the charging rate of the battery 40 arrives at the specific region or after the charging rate of the battery 40 is beyond the specific region.

Figure 6:
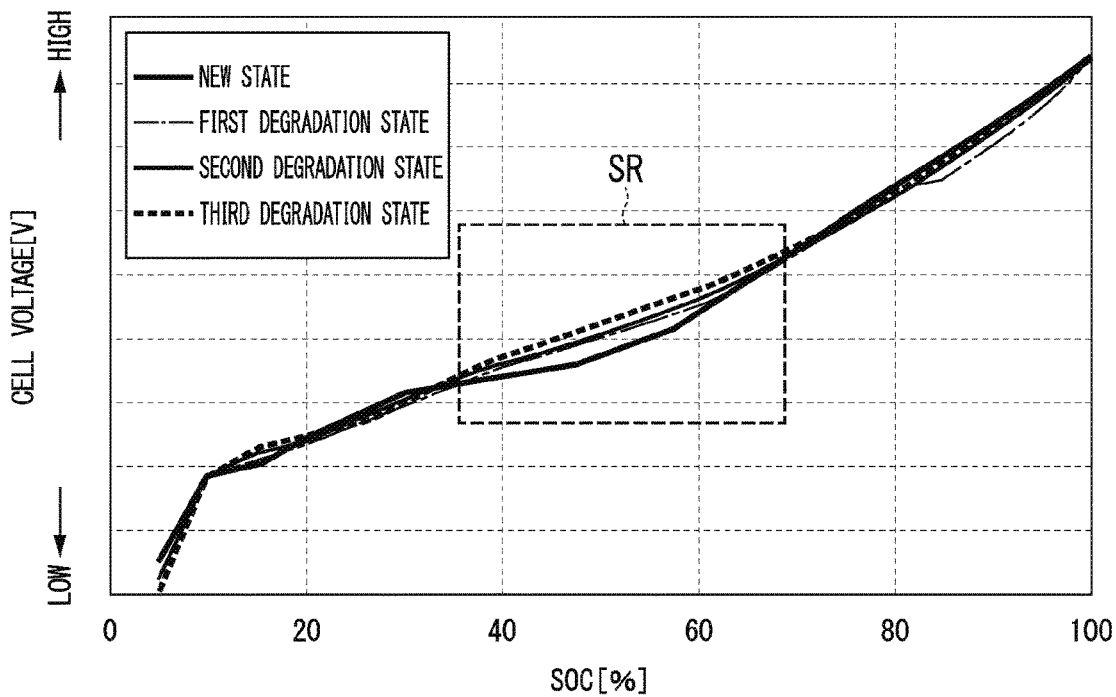
FIG. 6 is a view showing an example of a relationship between a voltage and a charging rate of a battery before degradation and after degradation of the battery.

FIG. 6 is a view showing an example of the relationship (SOC-OCV curve) between the voltage (cell voltage) and the charging rate of the battery 40 before degradation and after degradation of the battery 40. In the example shown in FIG. 6, in a region (specific region) SR from 35% to 68% of the charging rate of the battery 40, the relationship between the voltage and the charging rate of the battery 40 is greatly different (is different by more than a predetermined value) between before degradation and after degradation of the battery 40. On the other hand, in a region of less than 35% of the charging rate of the battery 40 and a region of 68% or more of the charging rate of the battery 40, the relationship between the voltage and the charging rate of the battery 40 is not so greatly different (is not different by more than a predetermined value) between before degradation and after degradation of the battery 40. Therefore, for the battery 40 of the example shown in FIG. 6, the charging control part 140 sets the first charging pause period R1 before the charging rate of the battery 40 arrives at 35% or after the charging rate of the battery 40 is beyond 68%. The information indicating the specific region SR of the battery 40 is stored in the storage part 110 in advance.

Figure 7:
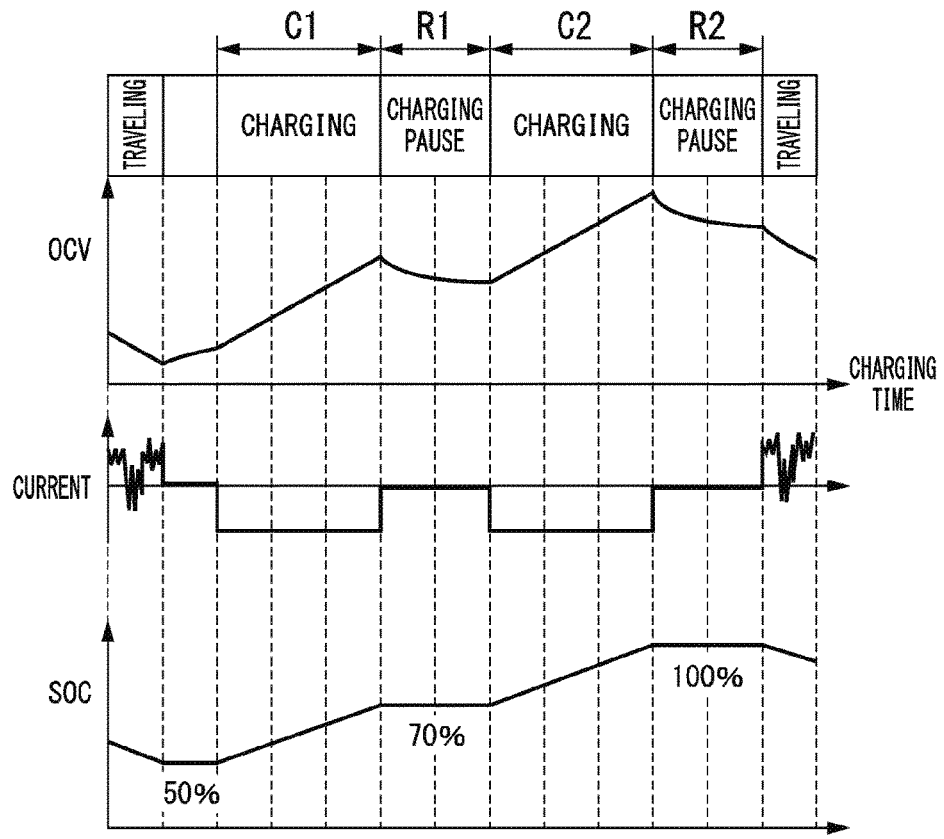
FIG. 7 is a view showing an example of a relationship between a setting position of a first charging pause period and the charging rate of the battery.

FIG. 7 is a view showing an example of a relationship between a setting position of the first charging pause period R1 and the charging rate of the battery 40. The example shown in FIG. 7 is a case where the vehicle 10 and the charger 200 are connected together in a state where the charging rate of the battery 40 is 50%, and a charging is started. The case where the charging rate of the battery 40 is 50% falls into the specific region SR. Therefore, the charging control part 140 does not set the first charging pause period R1 before the start of charging of the battery 40. The charging control part 140 sets the first charging pause period R1 after the charging of the battery 40 progresses and is, for example, beyond 70% of the charging rate of the battery 40.

Next, the derivation part 150 is described. The derivation part 150 derives a degradation degree of the battery 40 on the basis of a change amount of a charging rate of the battery 40 and an integration value of a charging current of the battery 40. For example, the derivation part 150 derives the degradation degree of the battery 40 on the basis of a first charging rate of the battery 40 at a first time point included in the first charging pause period R1, a second charging rate of the battery 40 at a second time point which is before the start of the charging time of the battery 40 or after the end of the charging time of the battery 40 (that is, before the start of the first charging period C1 set before the charging pause period R1 or after the end of the second charging period C2 set after the charging pause period R1), and an integration value of a charging current of the battery 40 between the first time point and the second time point.

In the present embodiment, the derivation part 150 derives the degradation degree of the battery 40 on the basis of a first charging rate of the battery 40 at a first time point included in the first charging pause period R1 provided in the middle of the charging time, a second charging rate of the battery 40 at a second time point included in the second charging pause period R2 provided after the end of charging, and an integration value of a charging current of the battery 40 between the first time point and the second time point. For example, the derivation part 150 derives the degradation degree of the battery 40 on the basis of a value obtained by dividing the integration value ($\Delta I$ [Ah]) of the charging current of the battery 40 between the first time point and the second time point by a difference ($\Delta SOC$ Fop between the first charging rate of the battery 40 and the second charging rate of the battery 40.

In the present embodiment, the derivation part 150 detects the first charging rate of the battery 40 on the basis of the information output from the battery sensor 42 after a time (first standby time) sufficient for stabilization of the state of the battery 40 has elapsed since the start of the first charging pause period R1. The derivation part 150 detects the second charging rate of the battery 40 on the basis of the information output from the battery sensor 42 after a time (second standby time) sufficient for stabilization of the state of the battery 40 has elapsed since the start of the second charging pause period R2.

The derivation part 150 associates the degradation degree of the battery 40 derived by the derivation part 150 with an elapsed time since the battery 40 is a new state and adds information to the degradation degree history information H2. Thereby, the information in which the degradation degree of the battery 40 and the elapsed time since the battery 40 is the new state are associated with each other is accumulated in the degradation degree history information H2.

Next, the learning part 160 is described. The learning part 160 learns the degradation degree of the battery 40 on the basis of the degradation degree history information H2 stored in the storage part 110. For example, the learning part 160 performs a statistical processing such as a clustering processing on the information (the degradation degree of the battery 40 at a plurality of time points) accumulated as the degradation degree history information H2. Thereby, it is possible for the learning part 160 to learn the degradation degree of the battery 40.

FIG. 8 is a view showing a specific example of the degradation degree of the battery 40 according to the embodiment. In FIG. 8, a solid line is a line showing a true degradation degree (true value) of the battery 40. In FIG. 8, a white circle is a derivation value of the degradation degree derived by the derivation part 150. In FIG. 8, a dotted line is a line showing a degradation degree (learned value) obtained by a least-square method being used to the derivation values. The vertical axis is a maximum capacity of the battery 40. The horizontal axis is an elapsed time from a new state of the battery 40. In FIG. 8, a case in which an initial maximum capacity when the battery 40 is new (at the time of shipping of the battery 40) and a current maximum capacity are the same value is 100% of the maximum capacity ratio.

In FIG. 8, the derivation values are present in a time series, and therefore, the degradation degree based on the derivation value is drawn as a two-dimensional graph. At this time, if there are a small number of derivation values, the values obtained by the statistical processing are discrete, and there may be cases in which it is impossible to successfully draw the two-dimensional graph of the degradation degree.

However, in the present embodiment, by performing the SOH charging in order to derive the degradation degree of the battery 40, it is possible to obtain a large number of derivation values.

The learning part 160 transmits the information indicating the degradation degree of the battery 40 obtained by learning to the display control part 64. The display control part 64 allows the display part 62 to display the information indicating the degradation degree of the battery 40 received from the learning part 160 (refer to FIG. 3).

Figure 9:
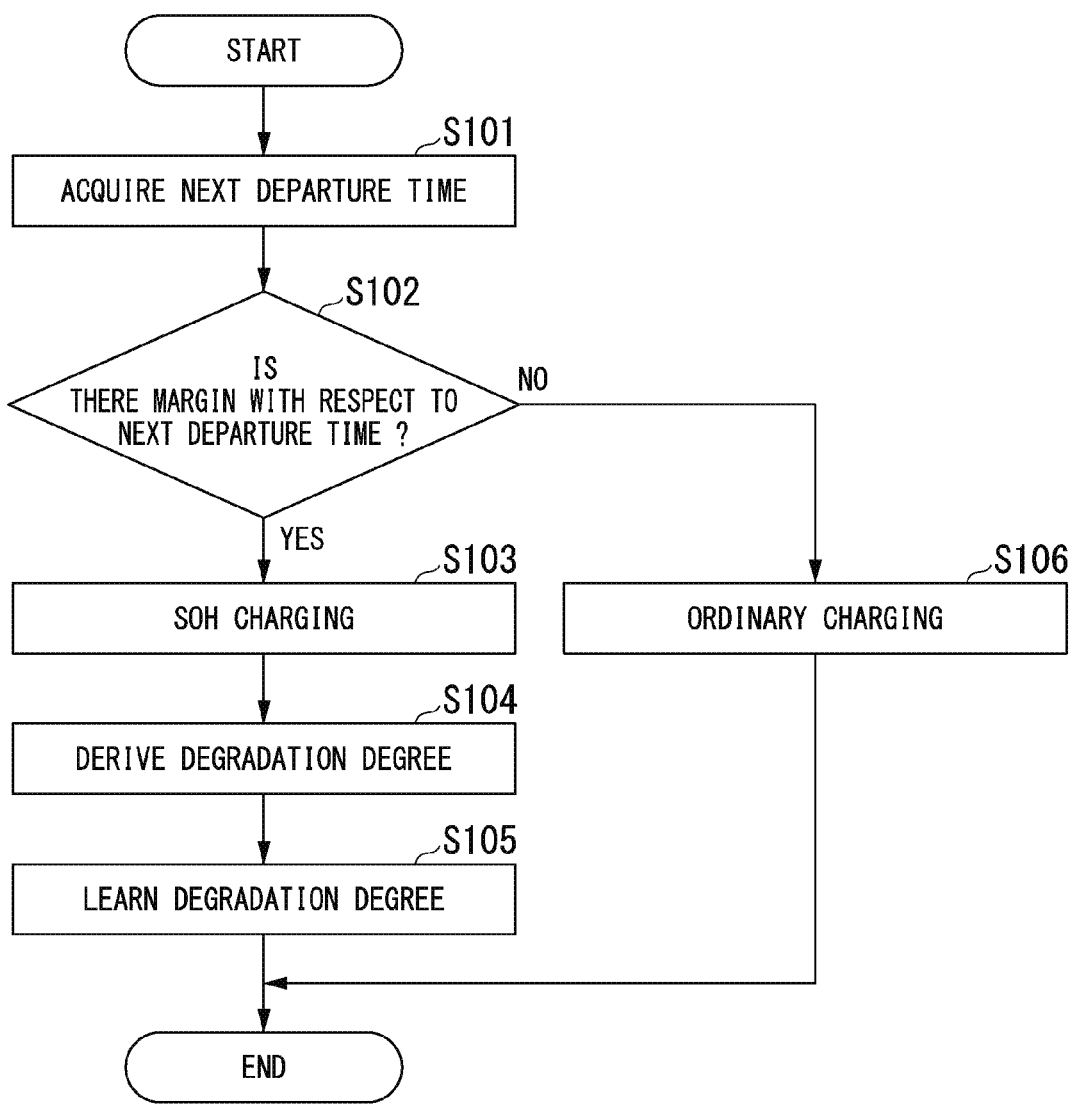
FIG. 9 is a flowchart showing a process flow for deriving the degradation degree.

FIG. 9 is a flowchart showing a process flow for deriving the degradation degree according to the embodiment. The flowchart of FIG. 9 is started, for example, by the vehicle 10 and the charger 200 being connected.

First, the charging control part 140 acquires information indicating the next departure time of the vehicle 10 (Step S101). For example, in a case where there is a user's input relating to the next departure time of the vehicle 10, the charging control part 140 acquires the information indicating the next departure time of the vehicle 10 from the information acquisition part 120. On the other hand, in a case where there is no user's input relating to the next departure time of the vehicle 10, the charging control part 140 acquires the next departure time of the vehicle 10 estimated by the estimation part 130 from the estimation part 130.

Next, the charging control part 140 determines whether the SOH calculation charging is performed on the basis of the remaining time until the next departure time of the vehicle 10 (Step S102). For example, the charging control part 140 determines that the SOH calculation charging is performed in a case where there is a margin of a predetermined time or more if the battery 40 is charged to the target charging rate with respect to the remaining time until the next departure time of the vehicle 10. On the other hand, the charging control part 140 determines that the SOH calculation charging is not performed (ordinary charging is performed) in a case where there is no margin of the predetermined time or more if the battery 40 is charged to the target charging rate with respect to the remaining time until the next departure time of the vehicle 10.

In a case where it is determined that the SOH calculation charging is performed, the charging control part 140 performs the SOH calculation charging (Step S103). Specifically, in a case where there is the specific region SR in which the relationship between the voltage and the charging rate of the battery 40 is changed by more than a predetermined value between before degradation and after degradation of the battery 40 in the transition range of the charging rate of the battery 40, the charging control part 140 sets the first charging pause period R1 in a region that avoids the specific region SR. Then, the charging control part 140 performs a charging of the battery 40 to a charging rate at which the first charging pause period R1 is set, and after arriving at the charging rate at which the first charging pause period R1 is set, the charging control part 140 pauses the charging of the battery 40. Then, in the first charging pause period R1, after the OCV of the battery 40 becomes stable, an accurate charging rate of the battery 40 is detected.

After the charging rate of the battery 40 is detected after the OCV of the battery 40 becomes stable, the charging control part 140 restarts the charging of the battery 40 and charges the battery 40 to the target charging rate.

Then, the charging control part 140 pauses the charging of the battery 40. Then, in the second charging pause period R2, after the OCV of the battery 40 becomes stable, an accurate charging rate of the battery 40 is detected.

In a case where the SOH calculation charging is performed, the derivation part 150 derives the degradation degree of the battery 40 on the basis of the charging rate of the battery 40 detected in the first charging pause period R1 after the OCV of the battery 40 becomes stable, the charging rate of the battery 40 detected in the second charging pause period R2 after the OCV of the battery 40 becomes stable, and an integration value of a charging current between the detection time points (Step S104).

In a case where the derivation value of the degradation degree of the battery 40 is newly derived by the derivation part 150, the learning part 160 performs learning on the basis of the newly derived derivation value (Step S105). Thereby, the learned value of the degradation degree of the battery 40 is newly obtained.

On the other hand, the charging control part 140 determines that the ordinary charging is performed in a case where there is no margin of the predetermined time or more if the battery 40 is charged to the target charging rate with respect to the remaining time until the next departure time of the vehicle 10. In a case where it is determined that the ordinary charging is performed, the charging control part 140 performs the ordinary charging (Step S106). In this case, the charging control part 140 charges the battery 40 to the target charging rate without providing the charging pause period in the middle of the charging time.

According to the diagnosis apparatus 100 configured as described above, it is possible to improve the derivation accuracy of the degradation degree of the battery 40. As a comparison example, a case in which only the ordinary charging is performed is considered. In this case, for example, since the charging rate of the battery 40 is detected in a state where the OCV is not stable, there may be cases in which it is difficult to derive the degradation degree of the battery 40 with high accuracy.

On the other hand, in the present embodiment, the charging control part 140 performs whether the specific charging in which the charging pause period is provided in the middle of the charging time of the battery 40 is performed on the basis of the remaining time until the next departure time of the vehicle 10. According to such a configuration, it is possible to ensure a long charging time, and it is possible to detect the charging rate of the battery 40 in a state where the state of the battery 40 is stable (for example, the OCV is in a stable state). Therefore, it is possible to enhance the derivation accuracy of the degradation degree of the battery 40.

In the present embodiment, the charging control part 140 determines that the specific charging is performed in a case where there is a margin of a predetermined time or more if the battery 40 is charged to the target charging rate with respect to the remaining time until the next departure time of the vehicle 10. According to such a configuration, it is possible to perform the specific charging without giving a disadvantage to the user of the vehicle 10.

In the present embodiment, in a case where there is the specific region SR in which the relationship between the voltage and the charging rate of the battery 40 is changed by more than a predetermined value between before degradation and after degradation of the battery 40 in the transition range of the charging rate of the battery 40, the charging control part 140 provides the charging pause period R1 before the charging rate of the battery 40 arrives at the specific region SR or after the charging rate of the battery 40 is beyond the specific region SR. According to such a configuration, it is possible to derive the degradation degree of the battery 40 by using the region of the charging rate in which the relationship between the voltage and the charging rate of the battery 40 is not easily changed between before degradation and after degradation of the battery 40. Thereby, it is possible to further enhance the derivation accuracy of the degradation degree of the battery 40.

In the present embodiment, the diagnosis apparatus 100 further includes the learning part 160 that learns the degradation degree of the battery 40 on the basis of the history information indicating the degradation degree of the battery 40 derived by the derivation part 150 at a plurality of time points. According to such a configuration, for example, by a statistical processing or the like, it is possible to further enhance the derivation accuracy of the degradation degree of the battery 40.

In the comparison example described above, for example, when the charging is started from a state where the charging rate of the battery 40 is 50%, since the state corresponds to the specific region SR described above, there is a possibility that a large error is included in the detected charging rate of the battery 40. In this case, there may be cases in which the diagnosis apparatus 100 does not derive the degradation degree on the basis of the charging rate described above in order to maintain the derivation accuracy of the degradation degree. As a result, depending on how the vehicle 10 is used, the derivation frequency of the degradation degree becomes small, and there may be cases in which the degradation degree history information H2 sufficient for a statistical processing by the learning part 160 is not collected.

However, in the present embodiment, the specific charging is performed by the charging control part 140, and thereby, it is possible to increase the frequency of deriving the degradation degree. Specifically, in the present embodiment, it is possible to increase the derivation frequency of the degradation degree while avoiding the specific region SR described above. As a result, it is possible to collect the degradation degree history information H2 sufficient for the statistical processing by the learning part 160, and it is possible to increase a learning opportunity of the learning part 160. Therefore, it is possible to further enhance the detection accuracy of the degradation degree by the learning part 160.

Further, there may be cases in which the OCV of the battery 40 does not easily become stable when the temperature of the battery 40 is low. Therefore, there may be cases in which it is possible to further enhance the derivation accuracy of the degradation degree of the battery 40 when the charging control part 140 determines whether the specific charging is performed on the basis of the remaining time until the next departure time of the vehicle 10 and the temperature of the battery 40 at the time of the start of charging. Further, there may be cases in which it is possible to further enhance the derivation accuracy of the degradation degree of the battery 40 when the charging control part 140 determines whether the specific charging is continued on the basis of the temperature of the battery 40 in a charging time of the battery 40 before the charging pause period R1.

Further, when the charging current of the charger 200 is small, the impact of an offset error of a current sensor is large, and there may be cases in which the derivation accuracy of the degradation degree of the battery 40 is degraded. Therefore, when the charging control part 140 determines whether the specific charging is performed on the basis of the remaining time until the next departure time of the vehicle 10 and the amplitude of the charging electric power that can be output by the charger 200, there may be cases in which it is possible to further enhance the derivation accuracy of the degradation degree of the battery 40.

The embodiment is not limited to the example described above. For example, in a case where the vehicle 10 and the charger 200 are connected together in a state where the charging rate is lower than the specific region SR, the charging control part 140 may provide the first charging pause period R1 before the start of charging of the battery 40. In this case, the second charging pause period R2 may be provided in the middle of the charging time of the battery 40. That is, the derivation part 150 may derive the degradation degree of the battery 40 on the basis of the charging rate of the battery 40 detected in the first charging pause period R1 before the start of charging of the battery 40, the charging rate of the battery 40 detected in the second charging pause period R2 provided in the middle of the charging time of the battery 40, and an integration value of a charging current between the detection time points.

Further, in place of the estimation part 130, the derivation part 150, and the learning part 160 of the diagnosis apparatus 100 being provided on the vehicle 10, for example, these parts may be provided on the charger 200 or a center server with which the vehicle 10 is able to communicate via a network. Further, in place of the charging control part 140 being provided on the vehicle 10, the charging control part 140 may be provided on the charger 200.

Although the embodiment of the present invention has been described, the invention is not limited to the embodiment, and a variety of modifications and replacements can be made without departing from the scope of the invention.

What is claimed is:

1. A diagnosis system, comprising:
    a charging control part that controls, upon connection between a vehicle and a charger provided at an outside of the vehicle, charging from the charger to a secondary battery provided on the vehicle; and
    a derivation part that derives a degradation degree of the secondary battery based on a change amount of a charging rate of the secondary battery and an integration value of a charging current of the secondary battery,
    wherein the charging control part determines, based on a remaining time until a next departure time of the vehicle, whether specific charging in which a charging pause period is provided in a middle of a charging time of the secondary battery is performed.

2. The diagnosis system according to claim 1,
    wherein the derivation part derives the degradation degree of the secondary battery based on a charging rate of the secondary battery at a first time point included in the charging pause period, a charging rate of the secondary battery at a second time point which is before a start of a first charging period set before the charging pause period or after an end of a second charging period set after the charging pause period, and an integration value of a charging current of the second battery between the first time point and the second time point.

3. The diagnosis system according to claim 1,
    wherein the charging control part determines that the specific charging is performed in a case where there is a margin of a predetermined time or more if the secondary battery is charged to a target charging rate with respect to the remaining time until the next departure time of the vehicle.

4. The diagnosis system according to claim 1,
    wherein the charging pause period is a time sufficient for stabilization of a state of the secondary battery.

5. The diagnosis system according to claim 1,
    wherein in a case where there is a specific region in which a relationship between a voltage and the charging rate of the secondary battery is changed by more than a predetermined value between before degradation and after degradation of the secondary battery in a transition range of the charging rate of the secondary battery, the charging control part provides the charging pause period before the charging rate of the secondary battery arrives at the specific region or after the charging rate of the secondary battery is beyond the specific region.

6. The diagnosis system according to claim 1, further comprising:
    a learning part that learns the degradation degree of the secondary battery based on history information indicating a degradation degree of the secondary battery derived by the derivation part at a plurality of time points.

7. The diagnosis system according to claim 1, further comprising:

an information acquisition part that acquires information indicating the next departure time of the vehicle based on a user's input relating to the next departure time of the vehicle, wherein the charging control part determines whether the specific charging is performed based on the information indicating the next departure time of the vehicle acquired by the information acquisition part.

8. The diagnosis system according to claim 1, further comprising:

an estimation part that estimates the next departure time of the vehicle based on a past action history of the vehicle, wherein the charging control part determines whether the specific charging is performed based on the next departure time of the vehicle estimated by the estimation part.

9. The diagnosis system according to claim 1, wherein the charging control part determines whether the specific charging is performed based on the remaining time until the next departure time of the vehicle and a temperature of the secondary battery at a time of a start of charging.

10. The diagnosis system according to claim 1, wherein upon determination that the specific charging is performed, the charging control part starts a charging of the secondary battery and determines whether the specific charging is continued based on a temperature of the secondary battery in a charging time of the secondary battery before the charging pause period.

11. The diagnosis system according to claim 1, wherein the charging control part determines whether the specific charging is performed based on the remaining time until the next departure time of the vehicle and an amplitude of charging electric power that can be output by the charger.

12. A diagnosis method performed by one or more computers, the diagnosis method comprising:

controlling, upon connection between a vehicle and a charger provided at an outside of the vehicle, charging from the charger to a secondary battery provided on the vehicle;

deriving a degradation degree of the secondary battery based on a change amount of a charging rate of the secondary battery and an integration value of a charging current of the secondary battery; and determining, based on a remaining time until a next departure time of the vehicle, whether specific charging in which a charging pause period is provided in a middle of a charging time of the secondary battery is performed.

13. A computer-readable non-transitory recording medium including a program causing one or more computers to execute:

controlling, upon connection between a vehicle and a charger provided at an outside of the vehicle, charging from the charger to a secondary battery provided on the vehicle;

deriving a degradation degree of the secondary battery based on a change amount of a charging rate of the secondary battery and an integration value of a charging current of the secondary battery; and determining, based on a remaining time until a next departure time of the vehicle, whether specific charging in which a charging pause period is provided in a middle of a charging time of the secondary battery is performed.

* * * * *